United States Patent [19]
Goldfarb

[11] Patent Number: 5,908,302
[45] Date of Patent: Jun. 1, 1999

[54] INGUINAL HERNIA MODEL

[76] Inventor: Michael A. Goldfarb, 409 Little Silver Point Rd., Little Silver, N.J. 07739

[21] Appl. No.: 09/096,952

[22] Filed: Jun. 12, 1998

[51] Int. Cl.[6] ................................................ G09B 23/28
[52] U.S. Cl. ......................... 434/262; 434/272; 40/800; 40/446
[58] Field of Search .................................. 434/262, 267, 434/269, 272, 273, 365, 430; 446/197, 198, 186, 187; 40/800, 610, 446

[56] References Cited

U.S. PATENT DOCUMENTS

| | | | |
|---|---|---|---|
| 3,236,368 | 2/1966 | Eisen | 40/800 |
| 3,758,358 | 9/1973 | Kuroda | 40/800 |
| 4,271,620 | 6/1981 | Vicino | 40/406 |
| 5,290,217 | 3/1994 | Campos . | |
| 5,456,720 | 10/1995 | Schultz et al. . | |

FOREIGN PATENT DOCUMENTS

| | | |
|---|---|---|
| 0411451A2 | 2/1991 | European Pat. Off. . |

*Primary Examiner*—Robert A. Hafer
*Assistant Examiner*—Bena B. Mile
*Attorney, Agent, or Firm*—Eckert Seamans Cherin & Mellott

[57] ABSTRACT

The invention provides a model for simulating inguinal hernias including a frame and a plurality of sheets supported by the frame in overlapping relation to one another to create an anatomically accurate simulation of a portion of a patient's abdomen. Each of the sheets includes openings defined therethrough. A pump is interconnected to and in flow communication with at least one conduit that is supported by the frame so that an open end of the conduit is positioned adjacent to the openings. At least one balloon is disposed in sealed flow communication with the at least one conduit and positioned through the openings so that when the pump is actuated, fluid is urged through the at least one conduit and into the at least one balloon thereby inflating the balloon so as to simulate a hernia sac. Three balloons are utilized to demonstrate an indirect inguinal hernia, a direct inguinal hernia, and a femoral hernia. Anatomically correct overlays may also be placed in overlapping relation to the front and back of the frame so as to show a patient the relative placement of other anatomical structures relative to the position of the hernia.

20 Claims, 8 Drawing Sheets

INGUINAL HERNIA MODEL

BACKGROUND OF THE INVENTION

1. Field of the Invention

The invention generally relates to the field of medical education, and more particularly to the provision of information, via simulation, to a prospective surgical patient, who is faced with surgery to repair an inguinal hernia, so that the patient is in a position to make an informed consent to the proposed surgical procedure.

2. Prior Art

A hernia is an abnormal protrusion of an organ, tissue, or any anatomical structure through a forced opening in some part of the surrounding abdominal muscle wall. For example, if a part of the intestine were to protrude through the surrounding abdominal wall, it would create a hernia—an abdominal hernia.

Hernias occur in both males and females in the groin area, also called the inguinal region. In both sexes, the abdominal wall may be weak on both right and left sides a little above the crease in the groin. Hernias are found most frequently in males where the potential for weakness originates during the development of the fetus when the testicles are located inside the abdomen. Just prior to birth, the testicles "descend" and leave the abdomen and enter the scrotum, the sac that contains the testicles. In doing so, they push their way through the lower portion of the abdominal wall. Although the abdominal wall "closes" around the spermatic cord to which the testicle is attached after the testicles descend, the area remains slightly weakened throughout adult life. If a part of the intestines or other tissue within the abdominal cavity pushes through one of the weak spots, it forms a hernia—an inguinal hernia.

Before the piece of intestine or other abdominal cavity tissue, called the hernial mass, makes its way through the weak spot in the muscle, it must first push its way through the peritoneum, the membrane that lines the abdomen. The hernial mass does not tear the peritoneum, however. Thus, when the intestine protrudes, it merely takes the peritoneum with it and is covered by it. The peritoneal covering surrounding the piece of protruding intestine is called a hernial sac.

Inguinal hernias can be indirect or direct. An indirect inguinal hernia occurs in the following manner. The lower part of the abdominal wall where such hernias occur, the inguinal region, is comprised of several layers. A defect lateral to the epigastric vessels is an indirect hernia. A defect medial to the epigastric vessels is a direct hernia. A patient may have one or both of these defects. In starting to form the hernia, the hernial mass begins protruding through the internal ring adjacent to the spermatic cord and lateral to the epigastric vessels. When the hernial mass stretches out or pushes through weakened muscle wall located medial to the epigastric vessels, it is called a direct inguinal hernia.

Femoral hernias occur when intra-abdominal organs protrude into the femoral canal through a large femoral ring. Various factors contribute to an enlarged femoral ring, including the medial insertion of the iliopubic tract into the Cooper's ligament, creating a large femoral canal. A femoral hernia is sometimes easy to recognize because it always is located below the inguinal ligament and medial to the femoral vessels. All of the above hernias may reoccur. As a result, subsequent surgery, at the same location, will be altered by previous surgery and new anatomical arrangements.

Prospective surgical patients must be provided with adequate, easily understandable information regarding any surgical procedure, prior to the surgery, in order to grant their "informed consent" to the procedure. Patients must be apprised of traditional anterior abdominal surgical approaches, as well as, laparoscopic methods. Also, the inclusion of prosthetic meshes, and the like, as a part of the surgical repair must be accurately and effectively described to the patient. Physicians have had few options to turn to for support in their efforts to provide a patient with easily understood explanations of these complex (at least to the patient) surgical procedures.

As a result, there is a need in the art to provide a simple, relatively low cost, and easily understood device for explaining inguinal hernia repair surgery to the prospective surgical patient.

SUMMARY OF THE INVENTION

The present invention provides a model for simulating inguinal hernias comprising a frame and a plurality of sheets supported by the frame in overlapping relation to one another so as to create an anatomically accurate simulation of a portion of a patient's abdomen. Each of the sheets includes at least one opening defined therethrough. A pump is interconnected to and in flow communication with at least one conduit that is supported by the frame so that an open end of the conduit is positioned adjacent to the openings. At least one balloon is disposed in sealed flow communication with the at least one conduit and positioned through the openings so that when the pump is actuated, fluid is urged through the at least one conduit and into the at least one balloon thereby inflating the balloon so as to simulate a hernia sac.

In one embodiment of the invention, three balloons are utilized to demonstrate an indirect inguinal hernia, a direct inguinal hernia, and a femoral hernia. An anatomically correct overlay may also be placed in overlapping relation to the back of the frame so as to show a patient the relative placement of other anatomical structures relative to the position of the hernia.

BRIEF DESCRIPTION OF THE DRAWINGS

These features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENTS

The following description of the preferred embodiments of the invention are intended to be read in connection with the foregoing drawings and are to be considered a portion of the entire written description of this invention. As used in the following description, the terms "horizonal", "vertical", "left", "right", "up", and "down", as well as adjectival and adverbial derivatives thereof (e.g., "horizontally", "rightwardly", "upwardly", etc.) simply refer to the orientation of the structure of the invention as it is illustrated in the particular drawing figure when that figure faces the reader or as specifically defined in the body of this description. Similarly, the terms "inwardly" and "outwardly" generally refer to the orientation of a surface relative to its axis of elongation, or axis of rotation, as appropriate. Also, the terms "connected" and "interconnected," when used in this disclosure to describe the relationship between two or more structures, means that such structures are secured or attached to each other either directly or indirectly through intervening structures, and includes pivotal connections. The term "operatively connected" means that the foregoing direct or indirect connection between the structures allows such structures to operate as intended by virtue of such connection.

Figure 1:
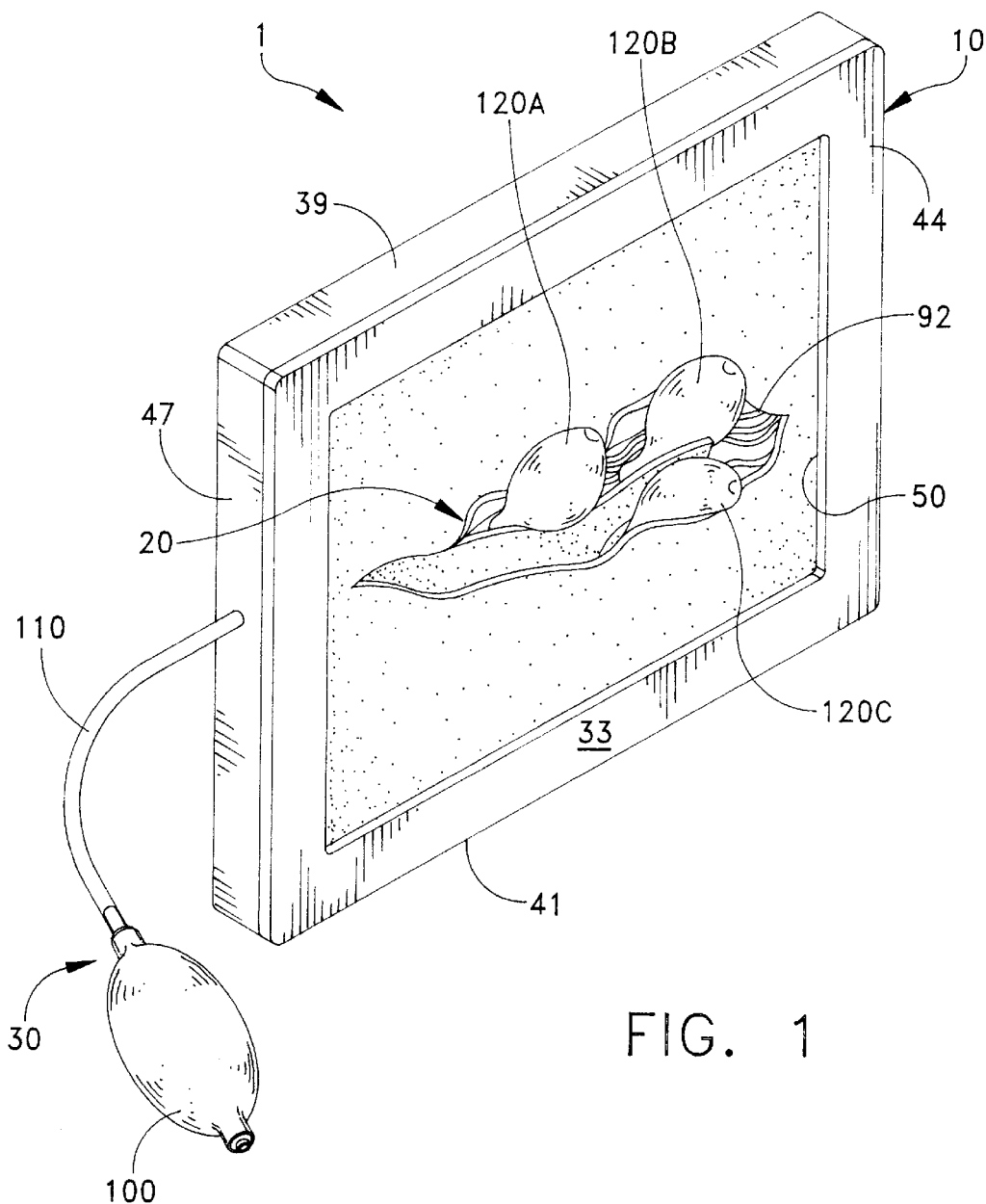
FIG. 1 is a perspective view of an inguinal hernia model formed in accordance with the present invention.

Referring to FIG. 1, inguinal hernia model 1 of the present invention generally comprises a frame 10, a plurality of sheets 20, and an inflation system 30. More particularly, frame 10 may be formed from any lightweight, substantially rigid material, such as metal, wood, or any of the known polymeric materials. Frame 10 may be constructed to have a rectangular, oval, or circular shape, and be sized to easily rest upon a desk top. Frame 10 comprises a front 33, a rear 36, a head or top side 39, a foot or bottom side 41, a left side 44, and a right side 47. Sides 39, 41, 44, 47 together define a centrally positioned view space 50 that is sized and shaped to expose the pertinent portions of plurality of sheets 20, as will hereinafter be disclosed in further detail.

It should be understood that the terms left and right are defined, relative to frame 10, from the anatomical perspective of the model, i.e., as used in connection with inguinal hernia model 1, left side 44 is the side of the model disposed to the viewers "right", and right side 47 is the side of the model disposed to the viewers "left".

Frame 10 may include integral support and fastening means 53 (FIG. 3) formed in the various sides of frame 10 (e.g., protrusions, shoulders, clips, rings, etc.,). Means 53 are adapted to retain plurality of sheets 20 in place on frame 10, and to help maintain them in an upright position on bottom side 41 for viewing by a patient.

Figure 6:
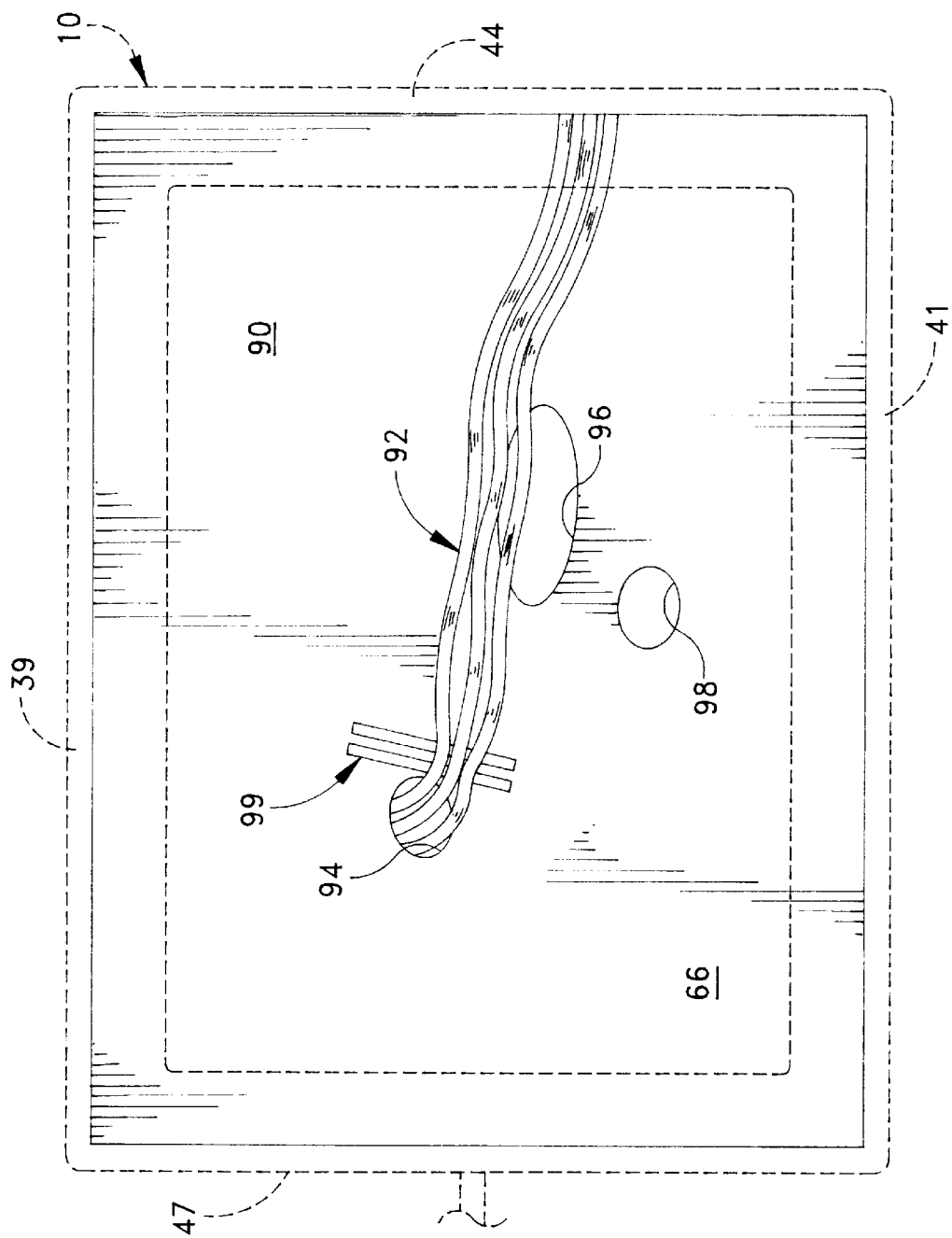
FIG. 6 is a front elevational view of a third sheet with the frame of FIGS. 1, 2, and 3 shown in phantom, and the first and second sheets of FIGS. 4 and 5 removed for clarity of illustration.
Figure 8:
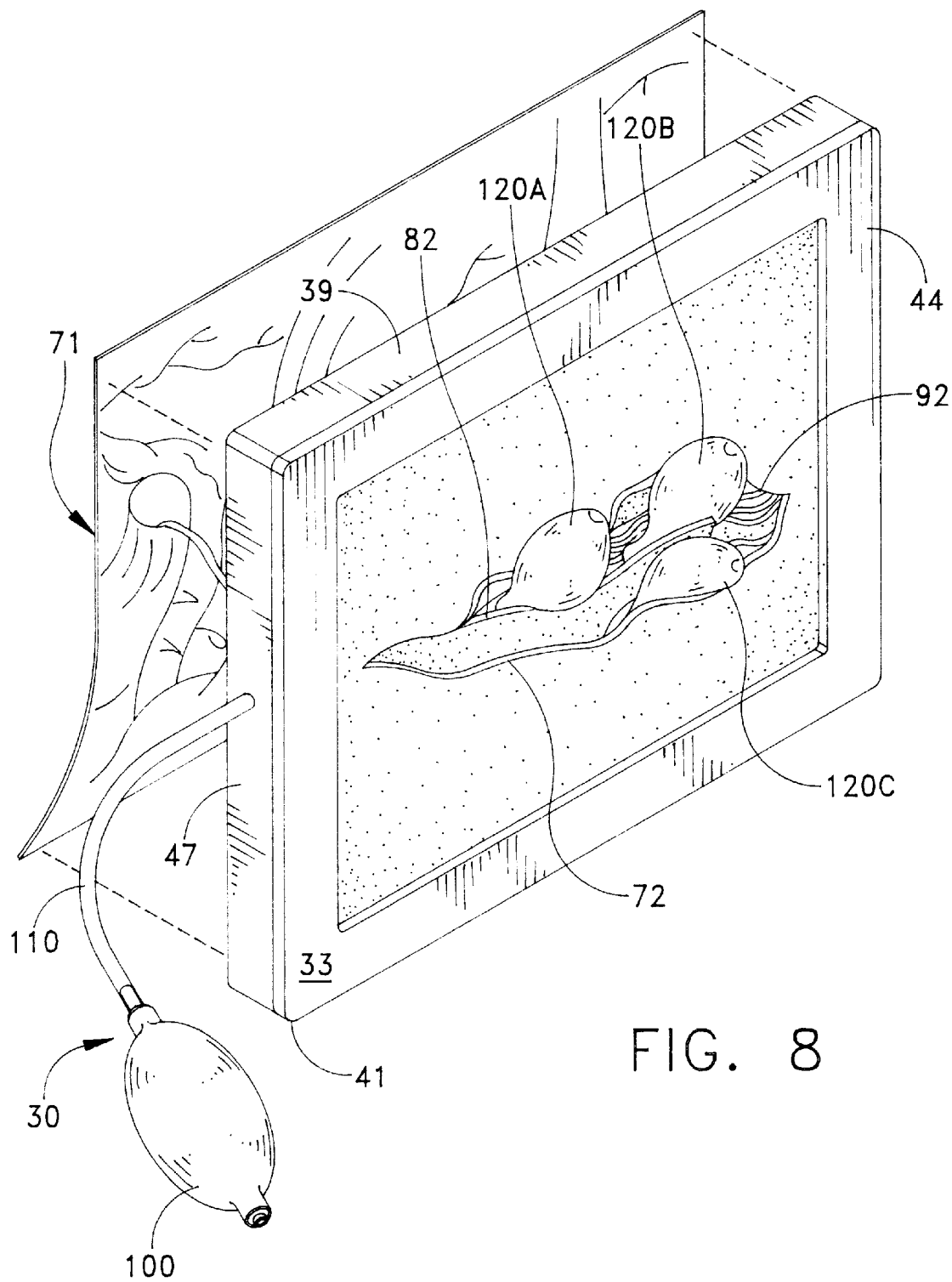
FIG. 8 is a perspective view of the inguinal hernia model shown in FIG. 1, also showing a sheet having an anatomically correct illustration depicted on one surface in position to be placed on the rear of the model.
Figure 9:
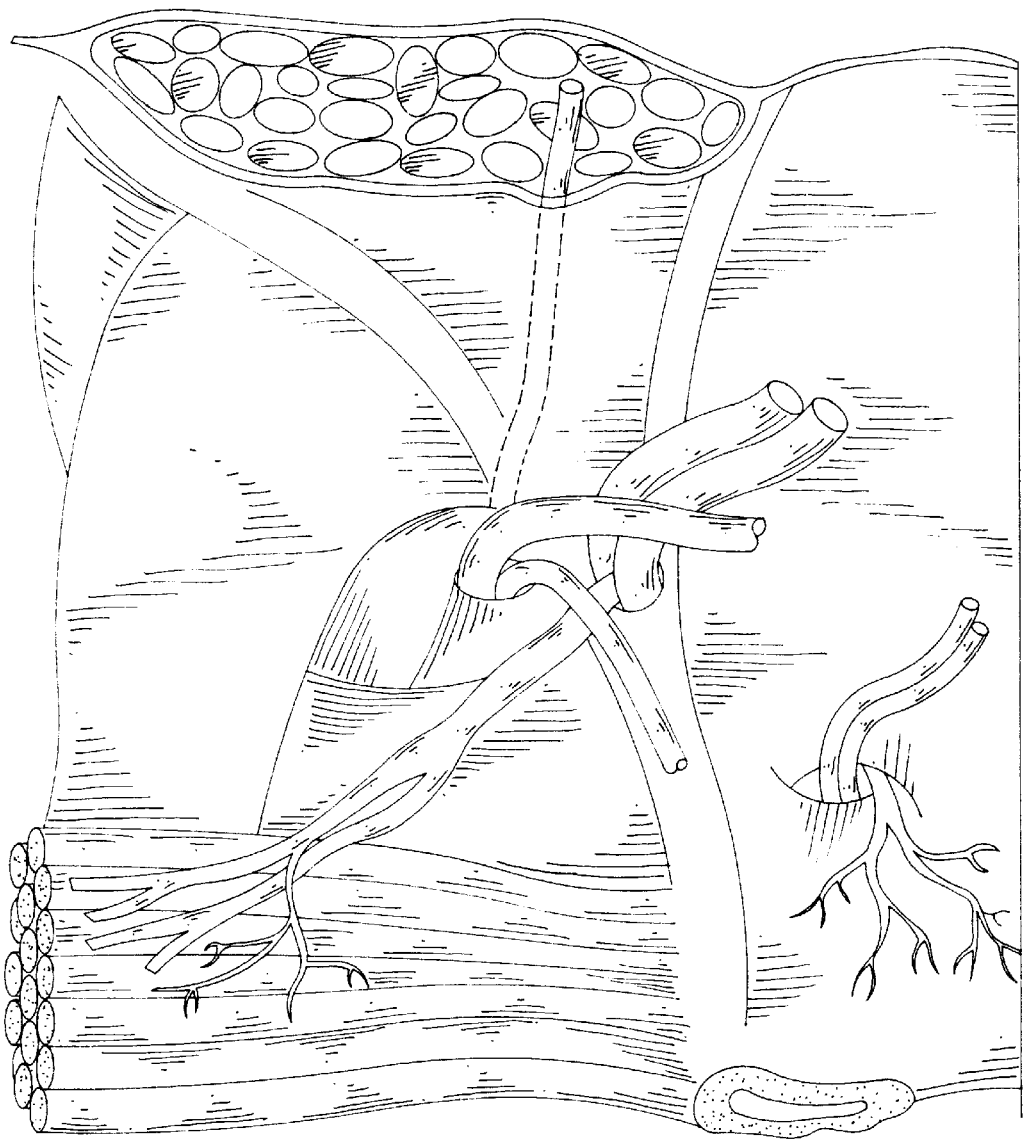
FIG. 9 is a plan view of a typical anatomical illustration that is placed onto the sheet shown in FIG. 8.

Plurality of sheets 20 comprise a first sheet 60, a second sheet 63, a third sheet 66 (FIG. 6), and a fourth sheet 69. Each sheet is formed from material that is adapted to simulate living animal tissue or the like, e.g., any one of the various cloth, leather, polymer, or elastomeric compounds that are known in the art for simulation of living animal tissue. Sheets 60,63,66,69 comprise a shape and size compatible with location between sides 39, 41, 44, 47, and within centrally positioned view space 50. An anatomically correct illustration sheet 71 (FIGS. 8 and 9) is also fastened to the rear portion of frame 10. Sheet 71 preferably comprises a card board or other light weight, flat material having appropriate anatomical structures illustrated on its outer surface, so that a physician can properly explain the structural relationship among the various anatomical structures and types of herniations simulated by inguinal hernia model 1.

Figure 2:
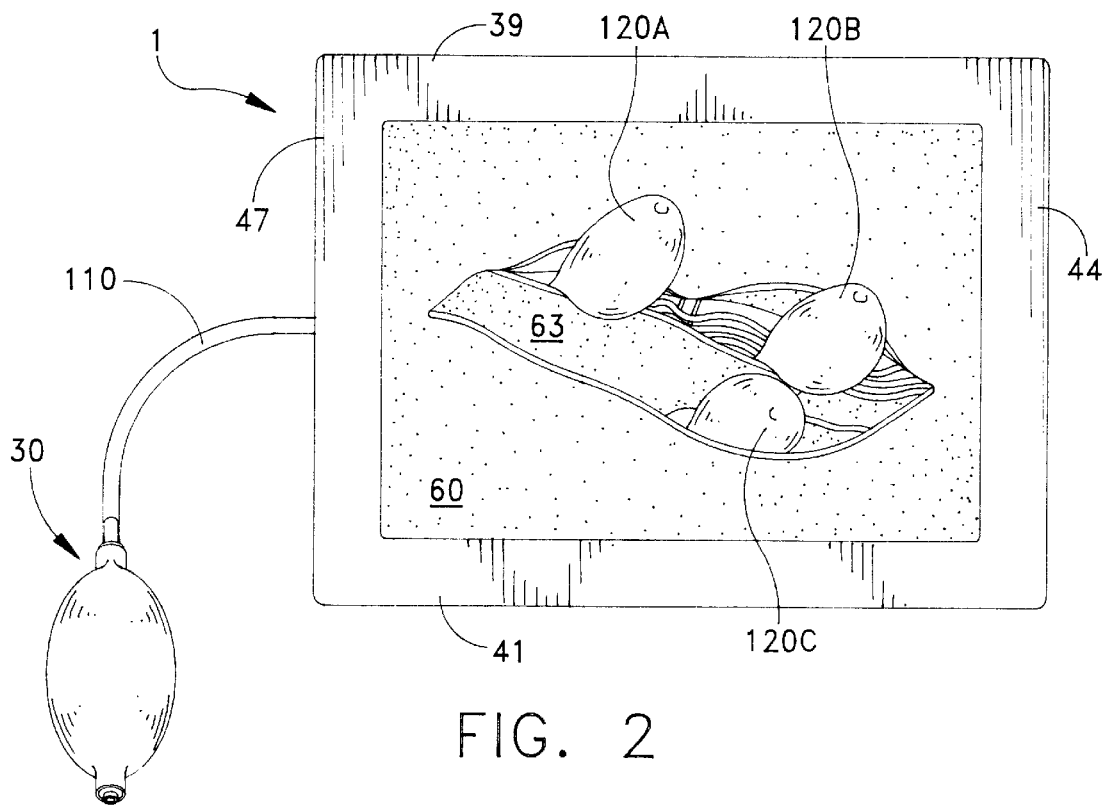
FIG. 2 is a front elevational view of the inguinal hernia model shown in FIG. 1.
Figure 4:
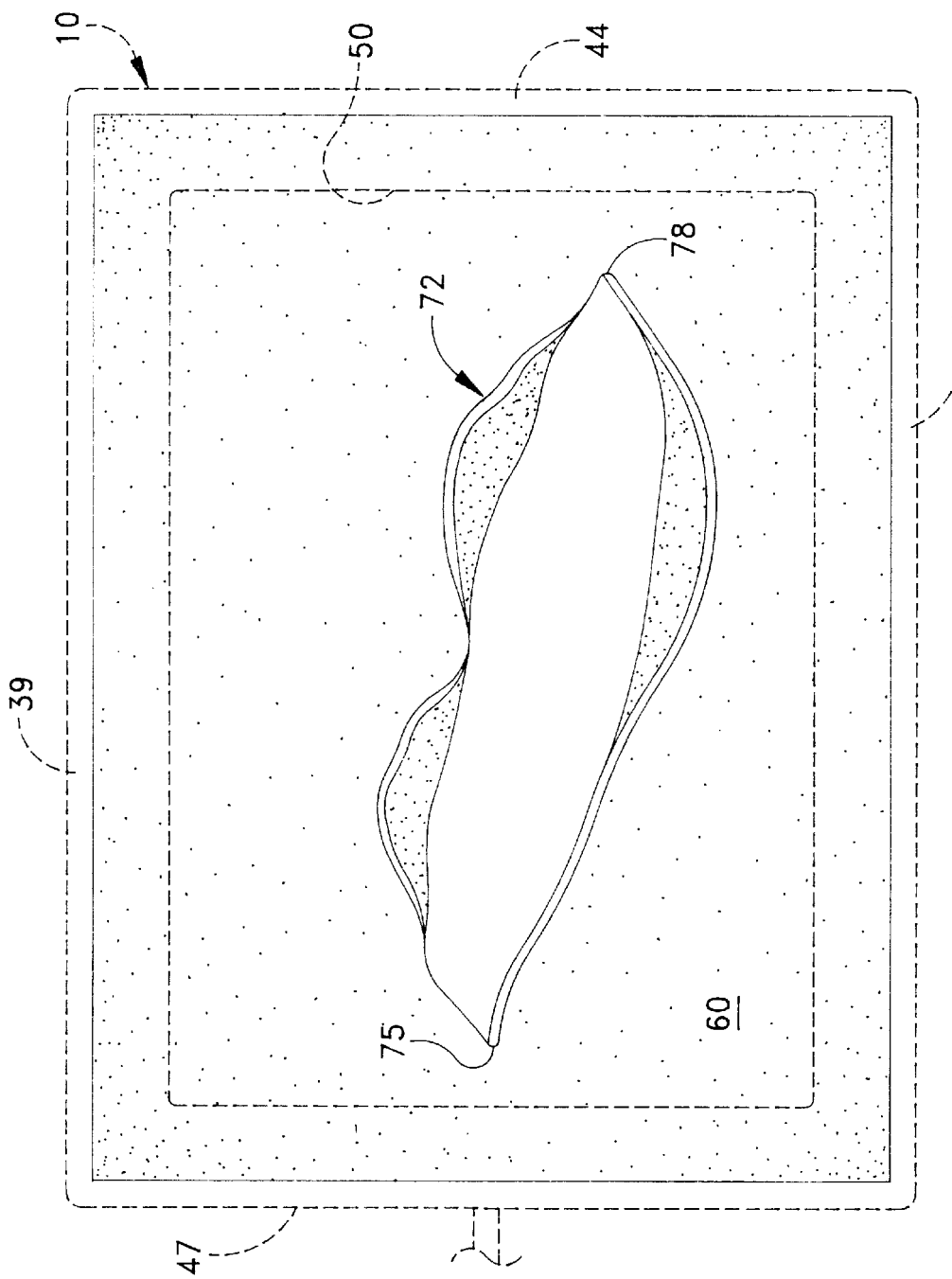
FIG. 4 is a front elevational view of a first sheet with the frame of FIGS. 1, 2, and 3 shown in phantom for clarity of illustration.
Figure 5:
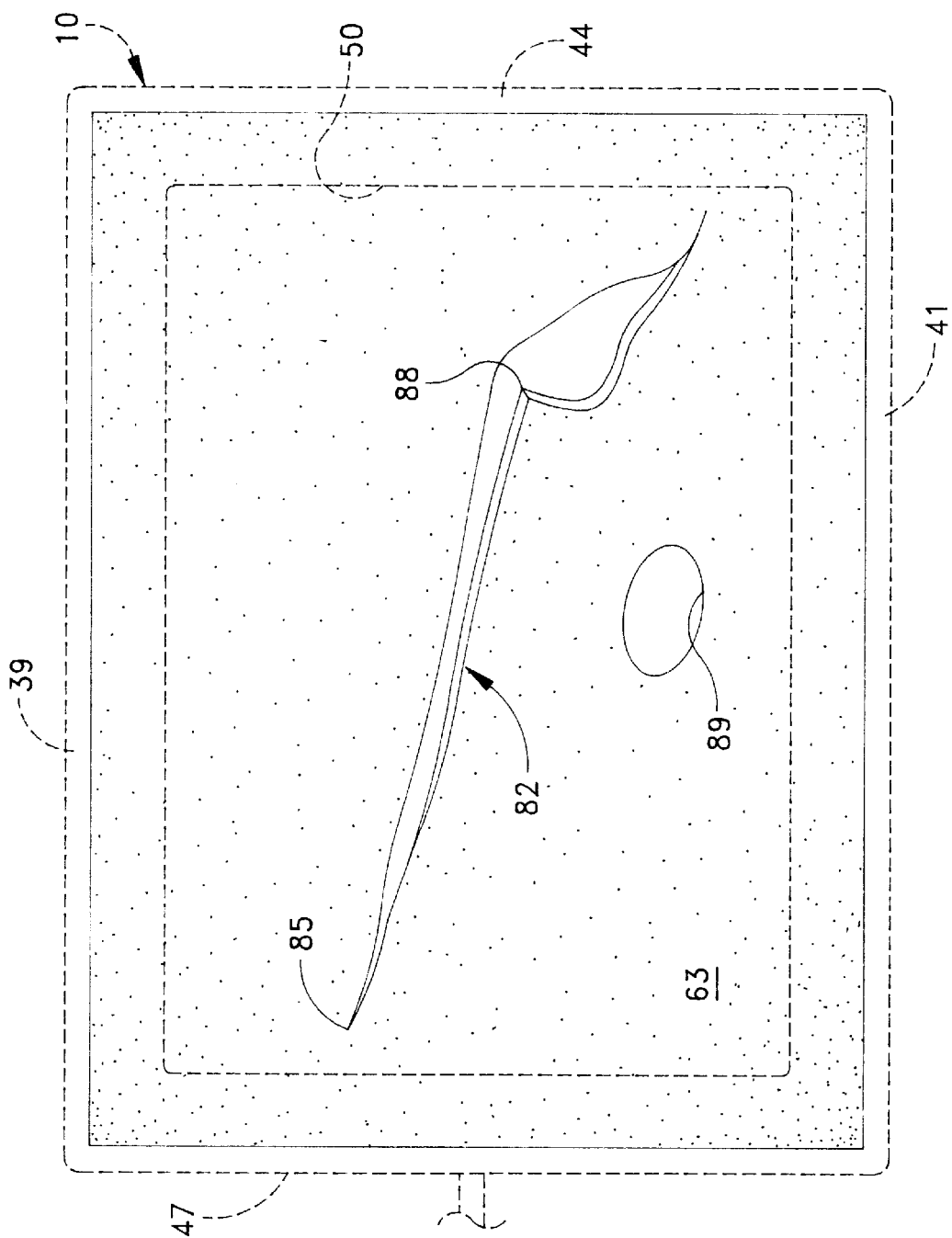
FIG. 5 is a front elevational view of a second sheet with the frame of FIGS. 1, 2, and 3 shown in phantom, and the first sheet of FIGS. 1, 2, and 4 removed for clarity of illustration.

Referring to FIGS. 1, 2, and 4, first sheet 60 is fabricated so as to resemble the epidermis of a surgical patient, and includes a diagonally oriented slit 72 having terminal points 75,78 that are disposed in spaced relation to left side 44 and right side 47, respectively, of frame 10. Second sheet 63 (FIGS. 1, 2, and 5) is fabricated so as to resemble the external oblique facia of a surgical patient. Second sheet 63 also includes a diagonally oriented slit 82 (resembling the divided external ring of the surgical patient) having terminal points 85,88 that are disposed in spaced relation to left side 44 and lower right side 47, respectively, of frame 10. Second sheet 63 also includes an opening 89 positioned below slit 82 and toward the lower left of slit 82 to represent a femoral defect in the external oblique fascia. When inguinal hernia model 1 is fully assembled, slit 82 is disposed directly below slit 72.

Third sheet 66 (best seen in FIG. 6) is fabricated so as to resemble the posterior wall (transverse muscle) of a surgical patient. Third sheet 66 includes a front surface 90 and a diagonally oriented group of cords 92 (representing spermatic cords) that extend from a point that is spaced from left side 44 to a point spaced from right side 47 of frame 10. When inguinal hernia model 1 is fully assembled (FIGS. 1, 2, and 8) cords 92 are positioned partially under portions of second sheet 63 so that cords 92 are partially visible within slits 72,82 of sheets 60,63. When inguinal hernia model 1 is fully assembled, front surface 90 is located directly below slits 72, 82, with cords 92 disposed directly below slit 82 in second sheet 63. Cords 92 are fabricated and colored to identify them, via contrast, as the spermatic cord of a surgical patient.

Third sheet 66 has defined through it three separate openings corresponding to the anatomically accurate location of an indirect defect opening 94, a direct defect opening 96, and a femoral defect opening 98. On front surface 90 of third sheet 66 a representation 99 of the epigastric artery and vein is illustrated. Representation 99 is positioned on surface 90 so that indirect defect opening 94 is positioned lateral to both the artery and the vein illustration, and direct defect opening 96 is medial to both the artery and the vein illustration.

Figure 7:
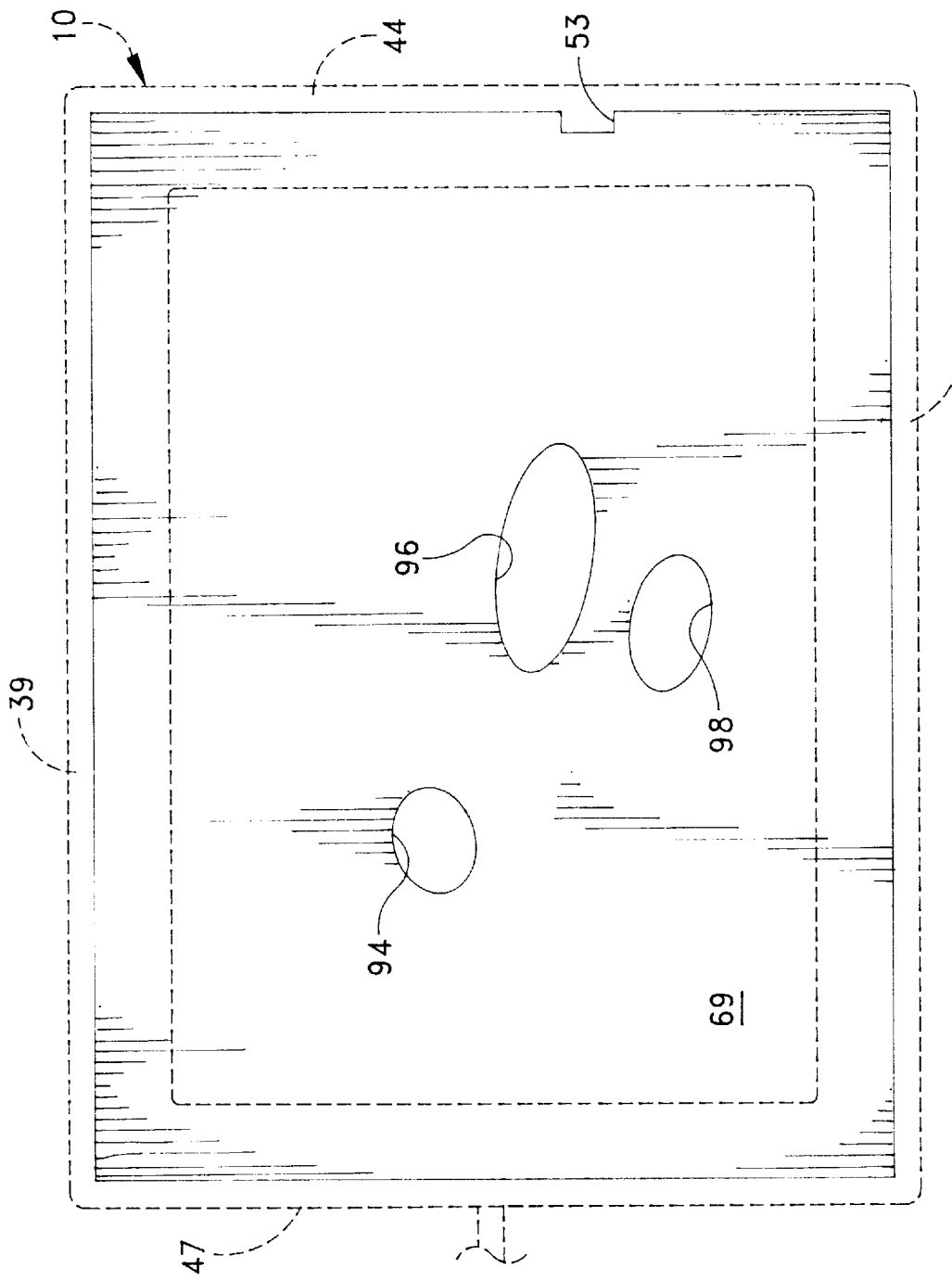
FIG. 7 is a front elevational view of a fourth sheet with the frame of FIGS. 1, 2, and 3 shown in phantom, and the first, second, and third sheets of FIGS. 4, 5, and 6 removed for clarity of illustration.

Fourth sheet 69 (FIGS. 3 and 7) is fabricated to provide structural support for first through third sheets 60,63,66, and inflation system 30. Fourth sheet 69 also defines three openings corresponding to the location of indirect defect 94, direct defect 96 and femoral defect 98.

Figure 3:
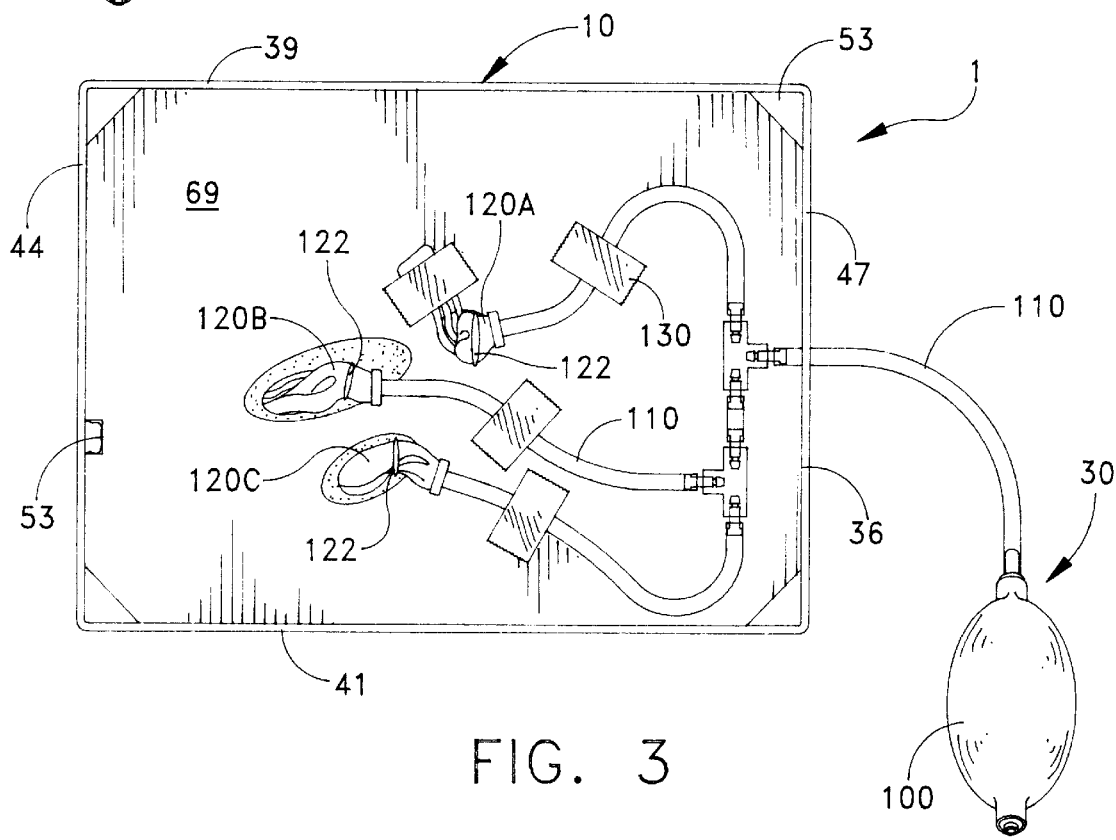
FIG. 3 is an elevational view of the rear of the inguinal hernia model shown in FIGS. 1 and 2.

Referring now to FIG. 3, inflation system 30 comprises a pump 100, a plurality of tubes 110, three balloons 120A, 120B,120C, and a plurality of fasteners and fittings 130. More particularly, pump 100 comprises any means for creating and releasing a positive fluid or gas pressure, e.g., an electric pump, a resilient diaphragm that is adapted to be squeezed, etc. Plurality of tubes 110 may comprise a system of individual flexible tubes fastened together in flow communication with one another by fasteners and fittings 130 (as shown in FIG. 3) or tubes 110 may comprise one integral tube or conduit having a system of branches extending therefrom. In either arrangement, each tube comprises a cannula capable of defining a flow path for a pressurized fluid or gas. Alternatively, conduits may be formed either within the structure of frame 10 or separate from it for the purpose of directing a fluid or gas, e.g., air, through inguinal hernia model 1. Balloons 120A,120B,120C comprise elastic, expandable thin walled membranes defining an interior space and including a single orifice 122. Balloons 120A,120B,120C expand and contract in response to pressurized gas being delivered to, and released from their interior space, via orifice 122 so as to simulate three types of hernial sac. Fasteners and fittings 130 comprise conventional devices for use in interconnecting and supporting tubes 110 to one another and to pump 100 and balloons 120A,120B,120C.

Inguinal hernia model 1 is assembled in the following manner. Frame 10 is positioned on a flat surface so that front 33 is in substantial contact with the flat surface and rear 36 faces the assembler. First sheet 66 is then placed onto frame 10. More particularly, first sheet 66 is first oriented so that slit 72 runs diagonally across frame 10 from left side 44 to right side 47. Once in this position, first sheet 60 is moved toward rear 36 of frame 10 until the marginal portions of first sheet 60 engage top and bottom sides 39,41 and left and right sides 44,47 of frame 10. Once in this position, diagonally oriented slit 72 is centrally disposed within view space 50 of frame 10. First sheet 60 is maintained in position on frame 10 by fastening means 53.

Second sheet 63 is then oriented so that it is disposed in confronting relation to first sheet 60 within frame 10. In this position, slit 82 is oriented in parallel relation to slit 72 of first sheet 60. Once in this position, second sheet 63 is moved toward first sheet 60 until second sheet 63 engages the rear surface of first sheet 60. In this position, slits 72,82 are disposed adjacent to one another. Once in this position, second sheet 63 is also fastened to frame 10 by fastening means 53.

Third sheet 66 having cords 92 and epigastric vein and artery representation 99 disposed on its front surface is then oriented so that the front surface of third sheet 66 is positioned in confronting relationship with the rear surface of second sheet 63. Once in this position, third sheet 66 is moved toward the rear surface of second sheet 63 until third sheet 66 engages second sheet 63. Once in this position, third sheet 66 is retained in frame 10 by fastening means 53.

It will be understood that once first, second and third sheets 60,63,66 are fastened in frame 10, indirect defect opening 94 and direct defect opening 96 are disposed above the opening formed by slits 72,82, i.e., toward head side 39 of frame 10, and femoral defect opening 98 is located below direct defect opening 96, i.e., toward bottom side 41 of frame 10. Also in this position, indirect defect opening 94 is located at a terminal end of spermatic cord 92 and positioned in close relation to terminal point 75 of slit 72. In this position, as viewed from front 33 of frame 10, second sheet 63, representing the external oblique fascia of a surgical patient, is disposed in overlapping relationship to indirect defect opening 94. At the same time, direct defect opening 96 is disposed below second sheet 63 and spermatic cord 92. In this position, epigastric artery and vein representation 99 is positioned between indirect and direct defect openings 94 and 96. Opening 89 in second sheet 63 is positioned below direct defect opening 96 and in coaxial alignment with femoral defect opening 98 in third sheet 66.

Once in this position, fourth sheet 69 is positioned in frame 10 according to a method similar to that described in connection with first sheet 60, second sheet 63, and third sheet 66, and is fastened to frame 10 by fastening means 53. Fourth sheet 69 is oriented so that its three openings correspond in location to the indirect defect opening 94, direct defect opening 96, and femoral defect opening 98 in third sheet 66 and second sheet 63.

Once fourth sheet 69 is fastened to rear 36 of frame 10, inflation system 33 is assembled to frame 10. More particularly, balloons 120A,120B,120C are fastened to three open branches of plurality of tubes 110 by fastener and fittings 130. Pump 100 is placed in sealed flow communication with an open end of plurality of tubes 110, and tubes 110 and balloons 120 are then positioned on the back surface of fourth sheet 69. Once in this position, one balloon each is positioned through openings 94,96,98 so as to represent distended hernial sac of a patient. Once balloons 120A, 120B,120C are positioned in defect openings 94,96,98, they protrude outwardly from front 33 of frame 10. In this position, the balloons representing an indirect defect and direct defect project outwardly through slits 72 and 82 while the balloon representing a femoral defect projects outwardly through opening 89 in sheet 63 and through slit 72 in first sheet 60. Rear sheet 71 may then be placed on rear 36 of frame 10 so as to complete the anatomical modeling of a patient's abdominal region, as seen in phantom from the back of the patient's body.

Inguinal hernia model 1 is used to inform a surgical patient of the types of hernias that are possible, and the surgical procedures necessary for correcting them, in the following manner. A surgeon places the model in front of the patient so that front 33 is disposed in confronting relation to the patient. Once in this position, the surgeon can then discuss the relevant anatomical structures and incisions necessary to obtain access to the defects in the abdominal wall. Once the incisions and anatomical structures are described, the surgeon merely actuates pump 100 so as to force gas into balloons 120A,120B,120C and inflates them so that they project outwardly through defect openings 94,96,98 to represent an indirect, direct, and femoral hernia.

It will be understood, that an appropriate switching system may be included in inflation system 30 so that by switching, only one balloon at a time is inflated upon actuation of pump 100. Also, one, two, three or more balloons may be used with inguinal hernia model 1 in order to show specific combinations of hernias.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A model for simulating inguinal hernias comprising:
   a frame;
   a plurality of sheets supported by said frame in overlapping relation to one another so as to create an anatomically accurate simulation of a portion of a patient's abdomen, each of said sheets defining at least one opening therethrough;
   a pump interconnected to and in flow communication with at least one conduit that is supported by said frame so that an open end of said conduit is positioned adjacent to said openings; and
   at least one balloon disposed in sealed flow communication with said at least one conduit and positioned through said openings so that when said pump is actuated fluid is urged through said at least one conduit and into said at least one balloon thereby inflating said balloon so as to simulate a hernia sac.

2. Apparatus according to claim 1 wherein anatomical features simulated on the left side of said sheets correspond to anatomical features located on the right side of the patient and further wherein anatomical features simulated on the right side of said sheets correspond to anatomical features located on the left side of the patient.

3. Apparatus according to claim 2 further comprising means adapted to retain said plurality of sheets in place on said frame thereby helping to maintain said sheets in an upright position on said frame for viewing by a patient.

4. Apparatus according to claim 1 wherein said plurality of sheets include a first sheet, a second sheet, a third sheet, and a fourth sheet.

5. Apparatus according to claim 4 wherein each of said sheets is formed from a material that is adapted to simulate living animal tissue.

6. Apparatus according to claim 4 further comprising a front anatomical overlay sheet and a rear anatomical overlay sheet pivotally fastened along an edge of said frame wherein said front and rear anatomical overlay sheets comprise a transparent material having appropriate anatomical structures illustrated on their surfaces so that a physician can properly explain the structural relationship among the various anatomical structures and the types of hernias.

7. Apparatus according to claim 4 wherein said first sheet is fabricated so as to resemble the epidermis of a surgical patient and includes a diagonally oriented slit.

8. Apparatus according to claim 4 wherein said second sheet is fabricated so as to resemble the external oblique facia of a surgical patient, and includes a diagonally oriented slit and an opening positioned below said slit to represent a femoral defect in the external oblique fascia.

9. Apparatus according to claim 4 wherein said first sheet slit is disposed directly below said second sheet slit.

10. Apparatus according to claim 4 wherein said third sheet is fabricated so as to resemble the posterior wall of a surgical patient, and includes a front surface and a diagonally oriented group of cords representing spermatic cords positioned partially under portions of said second sheet so that said cords are partially visible within said first and second sheet slits and said front surface is located directly below said slits with said cords disposed directly below said slits.

11. Apparatus according to claim 10 wherein said third sheet defines three separate openings corresponding to the anatomically accurate location of an indirect defect opening, a direct defect opening, and a femoral defect opening.

12. Apparatus according to claim 11 wherein said front surface of said third sheet includes at least a visual representation of the epigastric artery and vein.

13. Apparatus according to claim 12 wherein said representation is positioned on said front surface so that said indirect defect opening is positioned lateral to said representation and said direct defect opening is positioned medial to said representation.

14. Apparatus according to claim 4 wherein said fourth sheet is fabricated to provide structural support for said first through third sheets, and said pump and balloons.

15. Apparatus according to claim 14 wherein said fourth sheet defines three openings corresponding to the location of an indirect defect opening, a direct defect opening and a femoral defect opening.

16. Apparatus according to claim 1 wherein said pump comprises means for creating and releasing a positive fluid pressure.

17. Apparatus according to claim 1 wherein said at least one conduit comprises a plurality of tubes fastened together in flow communication with one another by fasteners, including a flexible cannula capable of defining a flow path for a pressurized fluid.

18. Apparatus according to claim 17 wherein said conduits are formed within the structure of said frame.

19. Apparatus according to claim 1 comprising three balloons arranged in fluid communication with said conduits so as to expand and contract in response to pressurized fluid being delivered to, and released from their interior space thereby simulating three types of hernial sac.

20. A model for simulating inguinal hernias comprising:
a frame having a front, a rear, a top side, a bottom side, a left side, a right side, and a centrally positioned view space;
a plurality of sheets each formed so as to simulate living animal tissue and arranged to create an anatomically accurate simulation of a portion of an abdomen and including;
a first sheet representative of a portion of the epidermis of said abdomen, said first sheet including a diagonally oriented slit representative of a surgical incision through said abdomen;
a second sheet representative of an external oblique facia of said abdomen, said second sheet including a diagonally oriented slit representative of a divided external ring of said abdomen;;
a third sheet representative of a posterior wall of said abdomen, said third sheet including three openings representative of an indirect defect, a direct defect, and a femoral defect in said posterior wall wherein said openings through said third sheet; and
an inflation system including a pump interconnected to and in flow communication with a plurality of tubes, said tubes being fastened to said rear of said frame and a rear surface of said third sheet and arranged so that an open end of one tube is positioned adjacent to each of said openings; and three balloons each having an opening and an expandable membrane wherein said opening is disposed in sealed flow communication with a respective one of said tubes and said expandable membrane positioned through said openings in said third sheet so that when said pump is actuated gas is forced through said plurality of tubes and into each of said balloons thereby inflating said balloons so as to simulate an indirect hernia sac, a direct hernia sac and a femoral hernia sac.

* * * * *